(12) United States Patent
Mitchell et al.

(10) Patent No.: US 8,612,106 B2
(45) Date of Patent: Dec. 17, 2013

(54) SYSTEM AND METHOD FOR CONTROLLING A TRANSMISSION TO IMPROVE EXHAUST BRAKING

(75) Inventors: Andrew L. Mitchell, Indianapolis, IN (US); Kevin L. Kluemper, Monrovia, IN (US); Brett R. Caldwell, New Palestine, IN (US)

(73) Assignee: GM Global Technology Operations LLC

( * ) Notice: Subject to any disclaimer, the term of this patent is extended or adjusted under 35 U.S.C. 154(b) by 430 days.

(21) Appl. No.: 12/908,360

(22) Filed: Oct. 20, 2010

(65) Prior Publication Data

US 2012/0101700 A1 Apr. 26, 2012

(51) Int. Cl.
*B60W 10/10* (2012.01)
*F16H 59/14* (2006.01)

(52) U.S. Cl.
USPC .................................. 701/58; 701/64; 701/99

(58) Field of Classification Search
USPC ............. 701/1, 51–58, 61, 64, 65, 70, 93, 95, 701/99, 108, 110, 116; 477/4, 47, 118; 188/273; 126/320
See application file for complete search history.

(56) References Cited

U.S. PATENT DOCUMENTS

| 5,634,446 | A | * | 6/1997 | Rauznitz et al. | 123/322 |
| 6,152,853 | A | | 11/2000 | Banks, III | |
| 6,652,414 | B1 | * | 11/2003 | Banks, III | 477/32 |
| 2002/0107629 | A1 | * | 8/2002 | Maruko et al. | 701/93 |
| 2009/0036267 | A1 | * | 2/2009 | Bellinger | 477/97 |
| 2009/0037047 | A1 | * | 2/2009 | Hawkins et al. | 701/36 |
| 2010/0049400 | A1 | * | 2/2010 | Duraiswamy et al. | 701/35 |
| 2010/0168976 | A1 | * | 7/2010 | Andrasko et al. | 701/70 |
| 2010/0250087 | A1 | * | 9/2010 | Sauter | 701/93 |
| 2010/0258080 | A1 | * | 10/2010 | Andrasko et al. | 123/323 |
| 2011/0106388 | A1 | * | 5/2011 | Boeckenhoff et al. | 701/70 |

FOREIGN PATENT DOCUMENTS

| DE | 11208000734 T5 | 2/2010 |
| DE | 102009033953 A1 | 2/2010 |

* cited by examiner

*Primary Examiner* — Jason Holloway

(57) ABSTRACT

A system for controlling a transmission of a vehicle powered by an engine includes a torque determination module and a shift determination module. The torque determination module determines a desired exhaust brake torque for the engine based on an actual speed of the vehicle and a desired speed of the vehicle. The shift determination module determines whether to shift between gear ratios of the transmission based on the desired exhaust brake torque and an exhaust brake torque capacity of the engine.

18 Claims, 4 Drawing Sheets

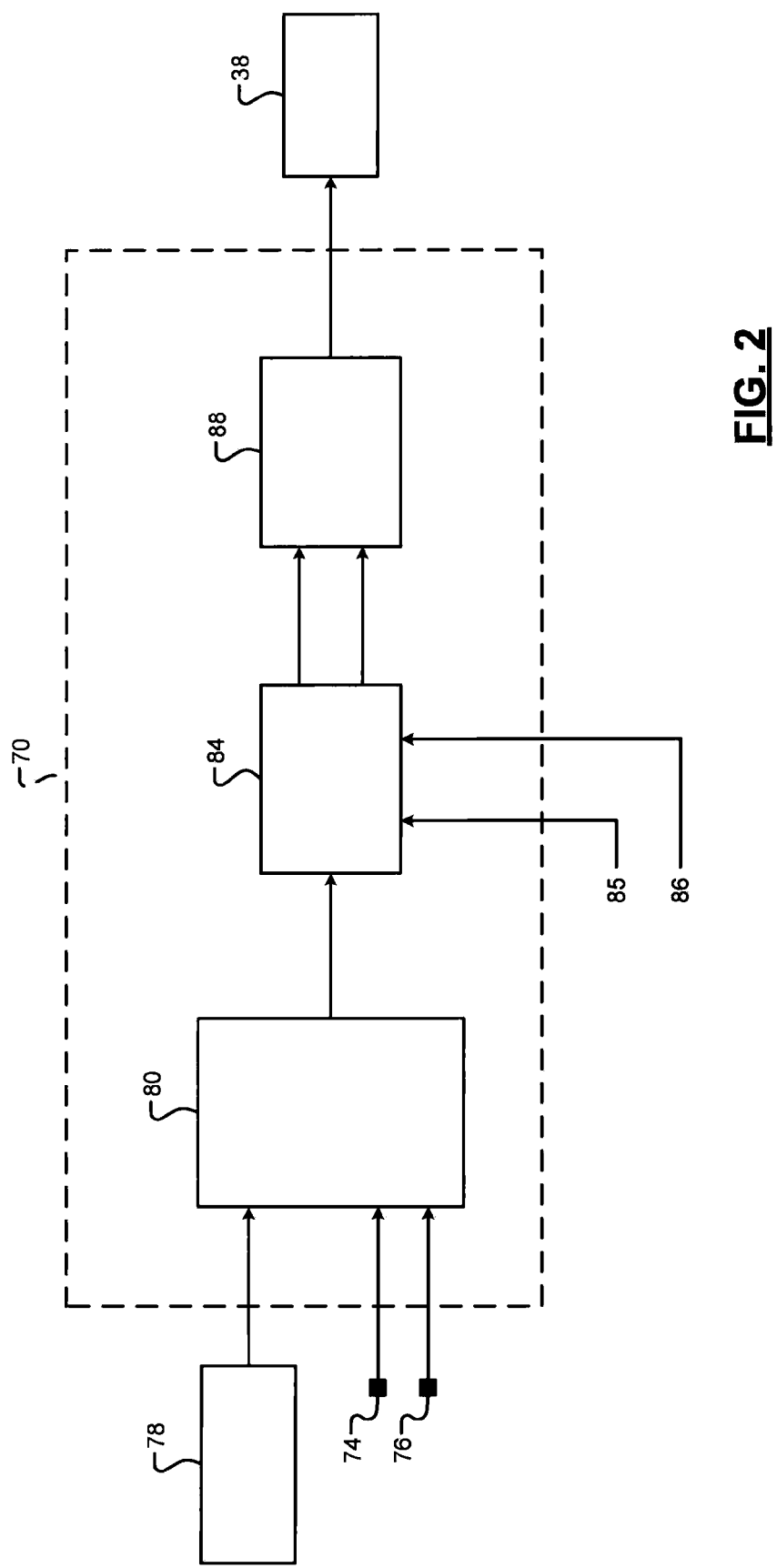

SYSTEM AND METHOD FOR CONTROLLING A TRANSMISSION TO IMPROVE EXHAUST BRAKING

FIELD

The present disclosure relates to transmission control systems, and more particularly to a system and method for controlling a transmission to improve exhaust braking.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an inlet that may be regulated by a throttle. The air may also be pressurized and forced into the intake manifold by a compressor (part of a turbocharger). The air in the intake manifold is distributed to a plurality of cylinders and combined with fuel to create an air/fuel (A/F) mixture. In compression ignition (CI) engines (e.g., diesel engines), for example, the pistons compress the air within the cylinders. Fuel may then be combined with (i.e., injected into) the compressed air causing the pressurized A/F mixture to combust.

The combustion of the A/F mixture drives pistons which rotatably turn a crankshaft generating drive torque. The drive torque may be transferred from the crankshaft to a driveline (e.g., wheels) of a vehicle via a transmission. Exhaust gas produced during combustion may be expelled from the cylinders into an exhaust manifold. The exhaust gas may include carbon monoxide (CO) and hydrocarbons (HC). The exhaust gas may also include nitrogen oxides (NOx) due to the higher combustion temperatures of CI engines compared to spark ignition (SI) engines. The exhaust manifold may be connected to one or more systems that receive the exhaust gas. For example, the exhaust gas may be routed to an exhaust treatment system, an exhaust gas recirculation (EGR) system, and/or a turbine system.

SUMMARY

A system for controlling a transmission of a vehicle powered by an engine includes a torque determination module and a shift determination module. The torque determination module determines a desired exhaust brake torque for the engine based on an actual speed of the vehicle and a desired speed of the vehicle. The shift determination module determines whether to shift between gear ratios of the transmission based on the desired exhaust brake torque and an exhaust brake torque capacity of the engine.

A method for controlling a transmission of a vehicle powered by an engine includes determining a desired exhaust brake torque for the engine based on an actual speed of the vehicle and a desired speed of the vehicle, and determining whether to shift between gear ratios of the transmission based on the desired exhaust brake torque and an exhaust brake torque capacity of the engine.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a functional block diagram of a control module according to one implementation of the present disclosure;

DETAILED DESCRIPTION

Figure 1:
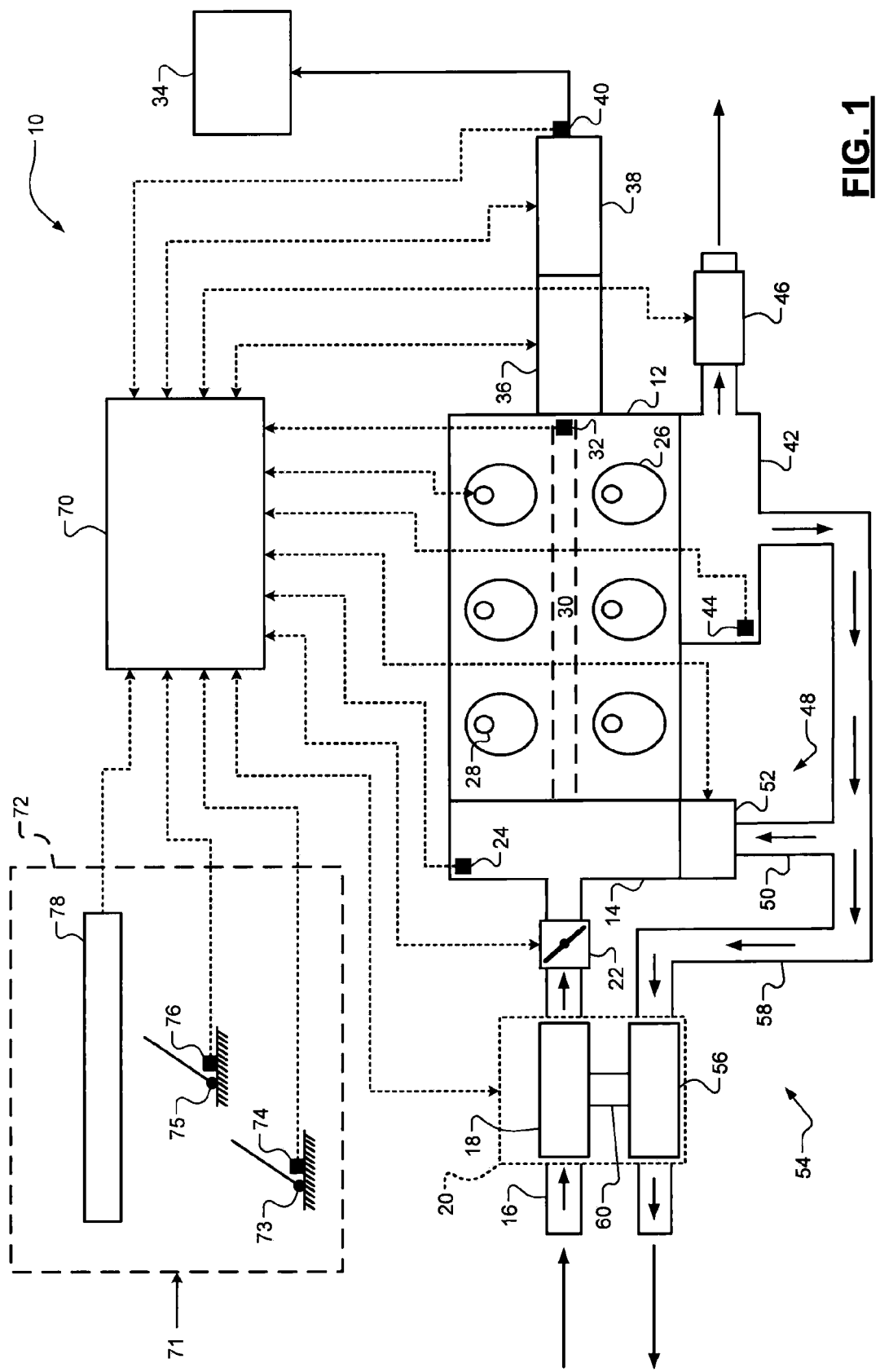
FIG. 1 is a functional block diagram of an engine system according to one implementation of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable hardware components that provide the described functionality.

Compression ignition (CI) engines (e.g., diesel engines) may operate in a plurality of modes. For example, in a normal mode the engine may combust an air/fuel (A/F) mixture and route the exhaust gas produced through at least one of an exhaust treatment system, an exhaust gas recirculation (EGR) system, and a turbine system. In an "exhaust braking" mode, however, the engine may slow the vehicle by increasing exhaust back pressure (EBP) and intake manifold absolute pressure (MAP). The EBP may be increased by closing off exhaust paths from the engine (e.g., to the atmosphere via an exhaust treatment system).

Specifically, the increased EBP opposes movement of the pistons during an exhaust stroke of the engine. The opposition to the movement of the pistons effectively applies braking forces through a driveline (e.g., wheels) of a vehicle to slow the vehicle. Additionally, a turbocharger may assist in increasing the EBP. For example, the turbocharger may be a variable nozzle turbocharger (VNT). More specifically, the increased exhaust gas velocity and increased pressure differential across a turbine of the turbocharger may increase turbine speeds inside the turbocharger. Accordingly, the increased MAP forces more air into the cylinders, which further increases EBP. For example, exhaust braking may be controlled by controlling vane position of the VNT. Additionally, for example, proportional-integral (PI) control of the amount of exhaust brake torque may be performed to more accurately control vehicle speed (i.e., to not over-brake).

Additionally, a control module may stop fueling to the engine to prevent positive torque from being generated by combustion, further improving exhaust braking performance. For example, exhaust braking may be useful when coasting down a hill because conventional CI engines are unthrottled and the vehicle may accelerate. In other words, the lack of a throttle results in a lack of intake vacuum when fueling is stopped and therefore no "drag effect" to slow the vehicle (in contrast to conventional spark ignition, or SI engines).

Exhaust braking, however, may be ineffective at low engine speeds. More specifically, EBP and/or MAP may be relatively low at low engine speeds, resulting in less effective exhaust braking. Therefore, high engine speeds may be ideal for effective exhaust braking. Conventional transmission control systems, however, may upshift between gear ratios when engine speed is above a predetermined threshold. In other words, conventional transmission control systems may attempt to maintain a relatively low engine speed to increase fuel economy and/or decrease emissions. Thus, conventional transmission control systems may decrease or eliminate the benefits of exhaust braking.

Additionally, conventional transmission control systems may actively change gears when cruise control is engaged. In other words, conventional transmission control systems may upshift or downshift when the vehicle speed is more than a predetermined amount from a cruise control speed set point. For example, the transmission control system may downshift when the driver brakes and may upshift when the driver accelerates. The excessive number of shifts may result in increased noise, vibration, and/or harshness (NVH). Moreover, as previously described, the excessive upshifting may decrease or eliminate the benefits of exhaust braking.

Accordingly, a system and method are presented that control a transmission of a vehicle that is powered by an engine to increase exhaust braking performance. More specifically, the system and method may determine a desired speed of the vehicle based on input from a driver of the vehicle. For example, the driver input may be based on at least one of a cruise control speed set point, vehicle acceleration, and vehicle braking. The system and method then determine whether to shift the transmission based on the desired speed, an actual speed of the vehicle, an acceleration of the vehicle, and an exhaust braking torque of the engine.

Referring now to FIG. 1, an engine system 10 includes an engine 12. For example, the engine 12 may be a CI engine (e.g., a diesel engine). The engine 12, however, may also be a different type of engine (e.g., a homogeneous charge compression ignition, or HCCI engine). The engine 12 draws air into an intake manifold 14 through an inlet system 16. The inlet system 16 may further include a compressor 18 (part of a turbocharger 20, also referred to as "turbo 20") that further pressurizes the air in the intake manifold 14. For example, the turbocharger 20 may be a VNT. The inlet system 16 may also include a throttle 22. For example, the throttle 22 may be electronically controlled (e.g., electronic throttle control, or ETC). The engine 12, however, may also be unthrottled. A MAP sensor 24 measures a pressure of air inside the intake manifold 14.

Air in the intake manifold 14 is distributed to a plurality of cylinders 26. While six cylinders are shown, the engine 12 may include other numbers of cylinders. The air may be combined with fuel from a plurality of fuel injectors 28 either before or during compression of the air by pistons (not shown) within the cylinders 26. In other words, in a diesel engine the air may be compressed and then injected with fuel via the fuel injectors 28 (i.e., direct fuel injection) to cause combustion of the A/F mixture. On the other hand, in an HCCI engine the air may be mixed with fuel from the fuel injectors 28 prior to compression (i.e., port fuel injection) and then compressed until the A/F mixture automatically ignites. Additionally, in an HCCI engine spark from spark plugs (not shown) may assist combustion of the A/F mixture.

The combustion of the A/F mixture drives the pistons (not shown), which rotatably turn a crankshaft 30 generating drive torque. An engine speed (RPM) sensor 32 measures a rotational speed of the crankshaft 30 (e.g., in revolutions per minute, or RPM). The drive torque may be transferred from the crankshaft 30 to a driveline 34 (e.g., wheels) of the vehicle via a transmission 38. The transmission 38 may be coupled to the crankshaft 30 via a torque converter 36 (e.g., a fluid coupling). A transmission output shaft speed (TOSS) sensor 40 measures a rotational speed of an output shaft of the transmission 38 (e.g., in RPM).

Exhaust gas resulting from combustion may be expelled from the cylinders 26 into an exhaust manifold 42. An EBP sensor 44 measures pressure of the exhaust gas in the exhaust manifold 42. An exhaust treatment system (ETS) 46 may treat the exhaust gas to reduce emissions before the exhaust gas is released into the atmosphere. For example only, the exhaust treatment system 46 may include at least one of an auxiliary HC injector, an OC, an SCR catalyst, NOx absorbers/adsorbers, a PM filter, and a catalytic converter.

An EGR system 48 recirculates the exhaust gas into the intake manifold 14. The EGR system 48 may include an EGR line 50 that connects the exhaust manifold 42 to the intake manifold 14. The EGR system 48 may also include an EGR valve 52 that regulates the introduction of exhaust gas into the intake manifold 14.

A turbine system 54 uses the exhaust gas to power a turbine 56 (part of the turbocharger 20). The turbine system 54 may include a turbine line 58 that connects the exhaust manifold 42 to the turbine 56 of the turbocharger 20. Specifically, the exhaust gas from the exhaust manifold 42 may flow through the turbine 56 causing the turbine 56 to rotate. The turbine 56 may be connected to a shaft 60 (part of the turbocharger 20). The shaft 60 of the turbocharger 20 powers the compressor 18. Additionally, the turbine line 58 may release the exhaust gas into the atmosphere. While the EGR line 50 and the turbine line 58 are shown as connecting to one common port of the exhaust manifold 42, the EGR line 50 and the turbine line 58 may be separate lines connected at separate ports to the exhaust manifold 42.

A control module 70 regulates operation of the engine system 10. While a single control module 70 is shown, the engine system 10 may include multiple control modules. For example, the engine system 10 may include separate engine control and transmission control modules. The control module 70 communicates with the turbocharger 20, the throttle 22 (if the engine 12 is throttled), the MAP sensor 24, the fuel injectors 28, the engine speed sensor 32, the transmission 38, the TOSS sensor 40, the EBP sensor 44, the exhaust treatment system 46, and/or the EGR valve 52. For example, the control module 70 may receive signals from the engine speed sensor 32 and the TOSS sensor 40 and may control the transmission 38. The control module 70 may also implement the system and/or method of the present disclosure.

The control module 70 also communicates with a driver input module 72. The driver input module 72 translates input from the driver of the vehicle (represented by signal 71) for use by the control module 70. The driver input module 72 may include an accelerator pedal 73, an accelerator pedal position sensor 74, a brake pedal 75, a brake pedal position sensor 76, and a cruise control interface module 78. The driver input module 72, however, may also include other suitable actuators and/or sensors for communicating driver input to the control module 70. For example, the driver input module 72 may allow the driver to activate or deactivate exhaust braking (e.g., via a switch).

The accelerator pedal position sensor 74 measures a position (i.e., an amount of depression) of the accelerator pedal 73. Similarly, the brake pedal position sensor 76 measures a position of the brake pedal 75. The cruise control interface module 78, on the other hand, receives input from the driver of the vehicle and communicates the input to the control module 70. For example only, the cruise control interface module 78 may include steering wheel controls and/or console controls that allow the driver of the vehicle to set a cruise control speed set point for the vehicle. The cruise control interface module 78 may also allow the driver to enable or disable cruise control (e.g., via a switch).

Referring now to FIG. 2, the control module 70 is shown in more detail. The control module 70 may include a speed determination module 80, a shift determination module 84, and a shift control module 88. The speed determination module 80 receives signals from the driver input module 72. Specifically, the speed determination module 80 may receive a signal from the cruise control interface module 78 indicating a cruise control speed set point. The driver of the vehicle, however, may not have input a cruise control speed set point and/or enabled cruise control of the vehicle. Therefore, the speed determination module 80 also receives signals from the accelerator pedal position sensor 74 and the brake pedal position sensor 76 indicating accelerator pedal position and brake pedal position, respectively.

The speed determination module 80 determines a desired speed of the vehicle. When the driver of the vehicle has enabled cruise control and input a cruise control speed set point, the desired speed of the vehicle may include the cruise control speed set point. When the driver of the vehicle has not enabled cruise control and/or has not input a cruise control speed set point, however, the desired speed may be determined based on the signals indicating accelerator pedal position and brake pedal position. Specifically, the speed determination module 80 may monitor behavior of the driver (e.g., accelerating and braking) to determine the desired speed. For example only, the desired speed may be an average speed of the vehicle during a predetermined period. The desired speed, however, may also be determined using other suitable methods.

The shift determination module 84 receives the desired speed from the speed determination module 80. The shift determination module 84 also receives signals indicating vehicle speed and vehicle acceleration (represented by signal 85 and signal 86, respectively). For example, the vehicle speed and the vehicle acceleration may be measured using the TOSS sensor 40. More specifically, the TOSS sensor 40 may measure the vehicle speed and multiple measurements from the TOSS sensor 40 during a period may be used to determine the vehicle acceleration. The vehicle speed and the vehicle acceleration, however, may also be measured or modeled using other suitable methods. For example, the vehicle acceleration may be measured using an accelerometer.

The shift determination module 84 may further include a torque determination module (not shown) that determines a desired amount of exhaust brake torque. For example, the desired amount of exhaust brake torque may be based on a difference between actual (measured) vehicle speed (e.g., from TOSS sensor 40) and the desired speed (from the speed determination module 80). Additionally, however, the desired amount of exhaust brake torque may be based on other parameters (e.g., vehicle acceleration). The shift determination module 84, however, may also determine the desired amount of exhaust brake torque.

Specifically, the desired amount of exhaust brake torque may be a value less than or equal to a maximum amount of exhaust brake torque that may be generated by the engine 12 (i.e., an exhaust brake torque capacity). The exhaust brake torque capacity may vary based on engine speed. In other words, as previously described, exhaust braking efficiency typically decreases as engine speed decreases. For example, the desired amount of exhaust brake torque may include a percentage of the exhaust brake torque capacity. The exhaust brake torque capacity may be based on MAP and/or EBP. The exhaust brake torque, however, may also be measured or modeled based on other parameters (e.g., a current gear ratio of the transmission 38).

The shift determination module 84 may determine whether to shift between gear ratios of the transmission 38 to increase exhaust braking performance. For example, the shift determination module 84 may determine and notify the shift control module 88 whether an upshift, no shift, or a downshift operation is required. The shift control module 88, based on the communication from the shift determination module 84, may then execute the required shift operation of the transmission 38. The shift determination module 84, however, may also control shifting between gear ratios of the transmission 38. In other words, for example, the shift control module 88 may be incorporated as part of the shift determination module 84.

Specifically, the shift determination module 84 may determine that an downshift is necessary when vehicle speed exceeds the desired speed by a predetermined speed ($VS_{TH}$), the vehicle acceleration is less than a predetermined acceleration ($VA_{TH}$), and the exhaust brake torque is greater than or equal to a predetermined amount (e.g., percentage) of the exhaust brake torque capacity at the current engine speed. For example only, the predetermined percentage may be 100%. The downshift of the transmission 38 may increase engine speed and thus increase the effectiveness of the exhaust braking.

For example, the predetermined speed $VS_{TH}$ may be based on a current transmission range. When the vehicle speed continues to increase, however, more downshifts may be commanded, and the predetermined speed $VS_{TH}$ may then be based on the number of commanded downshifts. For example, a shift counter may be incremented or decremented based on downshift or upshift operations of the transmission 38, respectively. When the vehicle speed begins to decrease, however (e.g., due to changes in road conditions), less exhaust brake torque may be required. Therefore, the shift determination module 84 may determine whether an upshift of the transmission 38 may be performed to improve vehicle performance while maintaining exhaust braking performance.

Specifically, the shift determination module 84 may calculate an amount of output torque currently generated by the transmission 38 by multiplying the commanded exhaust brake torque by a current gear ratio of the transmission 38. Additionally, an amount of output torque generated by the transmission 38 after an upshift and the exhaust brake torque capacity may also be calculated. When the calculated amount of output torque generated by the transmission 38 after a upshift (e.g., corresponding to a higher gear) is greater than the calculated amount of torque currently generated by the transmission 38, the shift determination module 84 may determine that an upshift of the transmission 38 may be performed. In other words, the shift determination module 84 may determine that an upshift of the transmission 38 is appropriate because exhaust braking performance may be maintained while decreasing engine speed, thus improving drivability and/or fuel economy and/or decreasing emissions. Additionally or alternatively, the shift determination module 84 may determine that an upshift of the transmission 38 is appropriate when the vehicle acceleration is greater than the acceleration threshold $VA_{TH}$ (e.g., when descending a grade).

As previously described, the shift control module 88 communicates with the shift determination module 84 to coordinate shifting between various gear ratios of the transmission 38. More specifically, the shift determination module 84 may send upshift and downshift signals to the shift control module 88. For example, first states (e.g., 1, or "YES") of the upshift and downshift signals, respectively, may indicate to the shift control module 88 to perform the corresponding shift operation (i.e., upshift or downshift). Second states (e.g., 0, or "NO") of the upshift and downshift signals, respectively, may indicate to the shift control module 88 to not to perform the corresponding shift operation (i.e., upshift or downshift).

For example only, the shift control module 88 may receive one of three combinations of the upshift and downshift signals corresponding to upshift, no shift, and downshift operations of the transmission 38. The shift control module 88 may then control the transmission 38 to execute the requested operation (e.g., upshift, no shift, or downshift). For example, the shift control module 88 may generate control signals for various components of the transmission 38 (e.g., clutches) to select a desired gear ratio that satisfies the requested operation.

Figure 3A:
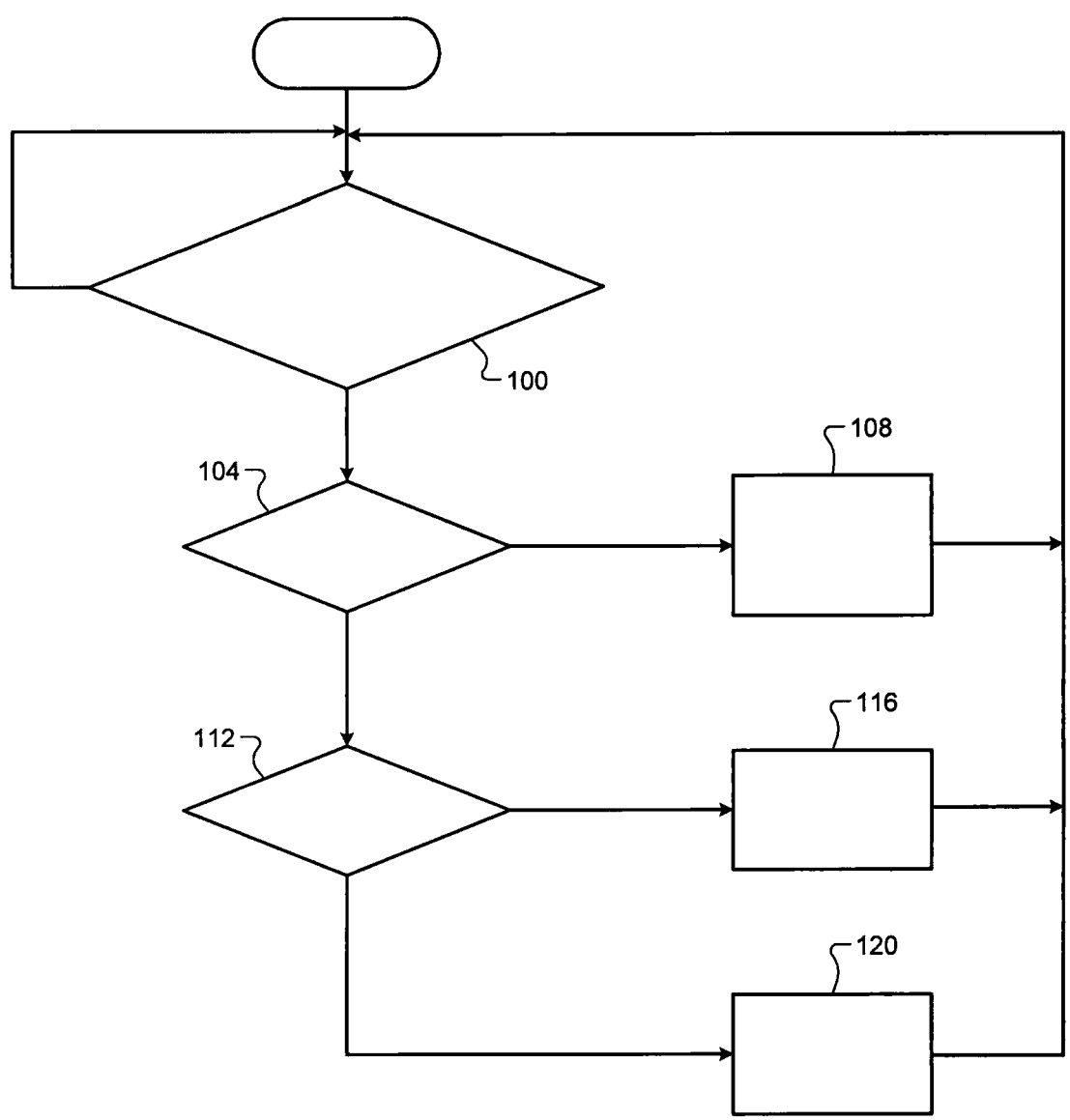
FIG. 3A is a flow diagram of a method for determining a desired speed of a vehicle according to one implementation of the present disclosure.

Referring now to FIG. 3A, an exemplary method for determining the desired speed of the vehicle begins at 100. In other words, the exemplary method depicted in FIG. 3A and described below may be used to simulate a cruise control speed set point based on driver input when cruise control is disabled or no cruise control speed set point has been input by the driver.

At 100, the control module 70 determines whether exhaust braking is activated and cruise control is disabled. As previously described, exhaust braking may be activated either by a switch actuated by the driver and/or automatically by the control module 70 based on operating parameters. Additionally, cruise control may be disabled by a switch actuated by the driver. Cruise control disablement, however, may also be satisfied by cruise control having been activated but no cruise control speed set point has been input by the driver. If true, control may proceed to 104. If false, control may return to 100.

At 104, the control module 70 may determine whether the vehicle is braking. For example, the vehicle may be braking when the brake position is greater than zero. If true, control may proceed to 108. If false, control may proceed to 112. At 108, the control module 70 may decrease the desired speed of the vehicle. For example, the desired speed of the vehicle may initially be set to a current speed of the vehicle. Control may then return to 100.

At 112, the control module 70 may determine whether the vehicle is accelerating. For example, the vehicle may be accelerating when descending a grade. If true, control may proceed to 116. If false, control may return to 120. At 116, the control module 70 may adjust the desired speed based on the vehicle speed. In other words, the desired speed may track the actual (e.g., measured) vehicle speed. Control may then return to 100.

At 120, the control module 70 may maintain the desired speed. In other words, the desired speed may not be adjusted because the driver input indicates that the current vehicle speed is desired by the driver. Control may then return to 100.

Figure 3B:
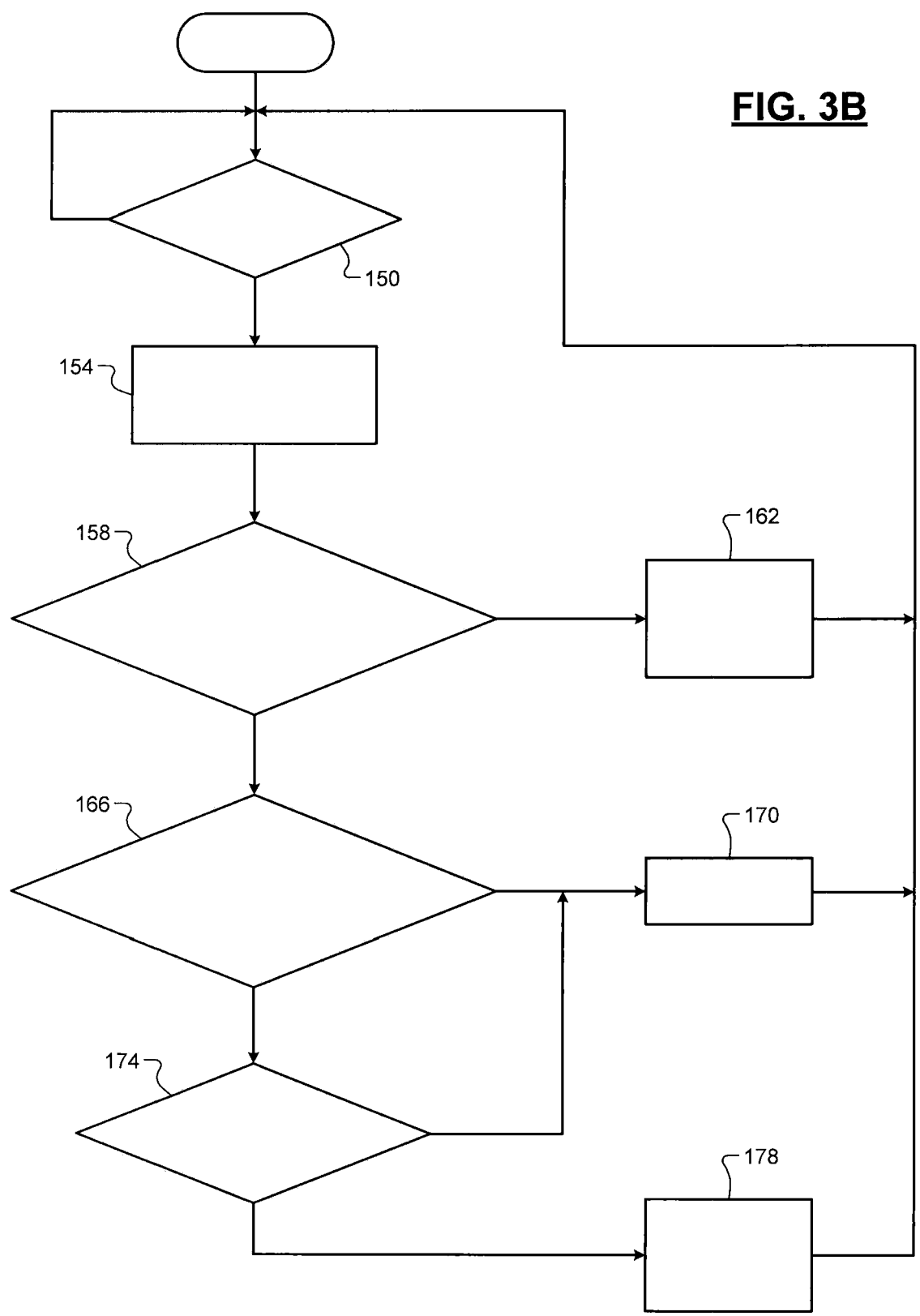
FIG. 3B is a flow diagram of a method for controlling a transmission to improve exhaust braking according to one implementation of the present disclosure.

Referring now to FIG. 3B, an exemplary method for controlling the transmission 38 to improve exhaust braking begins at 150. At 150, the control module 70 determines whether exhaust braking is activated. For example, exhaust braking may be activated via a switch that is actuated by the driver of the vehicle. Exhaust braking, however, may also be actuated automatically by the control module 70 based on various operating parameters. If true, control may proceed to 154. If false, control may return to 150. At 154, the control module 70 determines the desired speed of the vehicle. The control module 70 may also calculate the various exhaust brake (EB) torques used in determining whether a shift of the transmission 38 is necessary.

At 158, the control module 70 determines whether vehicle acceleration is greater than the vehicle acceleration threshold $VA_{TH}$ or whether the calculated exhaust brake torque associated with an upshift is greater than the calculated exhaust brake torque associated with the current gear (e.g., both calculated at 154). For example only, the vehicle acceleration may be greater than the vehicle acceleration threshold $VA_{TH}$ when the vehicle is descending a grade. If true, control may proceed to 162. If false, control may proceed to 166.

At 162, the control module 70 may upshift between gear ratios of the transmission 38. The control module 70 may also decrement a shift counter (e.g., count=count−1). Control may then return to 150.

At 166, the control module 70 may determine whether the calculated exhaust brake torque associated with the current gear is greater than the predetermined amount of the exhaust brake torque capacity (i.e., maximum exhaust brake torque). For example, the predetermined amount may include a predetermined percentage. If false, control may proceed to 170. If true, control may proceed to 174. At 170, the control module 70 may not shift between gear ratios of the transmission 38. Control may then return to 150.

At 174, the control module 70 may determine whether a difference between the vehicle speed and the desired speed is greater than the predetermined speed threshold $VS_{TH}$. As previously described, the predetermined speed threshold $VS_{TH}$ may be based on at least one of the transmission range at the current gear ratio and the shift counter. If false, control may proceed to 170. If true, control may proceed to 178. At 178, the control module 70 may downshift between gear ratios of the transmission 38. The control module 70 may also increment a shift counter (e.g., count=count+1). Control may then return to 150.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for controlling a transmission of a vehicle powered by an engine, comprising:
 a torque determination module that determines a desired exhaust brake torque for the engine based on an actual speed of the vehicle and a desired speed of the vehicle;
 a shift determination module that determines whether to shift between gear ratios of the transmission based on whether the desired exhaust brake torque is greater than or equal to a predetermined amount of an exhaust brake torque capacity of the engine at a current engine speed; and a speed determination module that determines the desired speed of the vehicle based on driver input during a predetermined period, wherein the driver input includes acceleration and braking of the vehicle.

2. The system of claim 1, wherein the speed determination module determines the desired speed of the vehicle based on a cruise control speed input by a driver of the vehicle.

3. The system of claim 1, wherein the desired speed decreases based on braking of the vehicle, and wherein the desired speed increases and tracks the vehicle speed based on acceleration of the vehicle.

4. A system for controlling a transmission of a vehicle powered by an engine, comprising:

a torque determination module that determines a desired exhaust brake torque for the engine based on an actual speed of the vehicle and a desired speed of the vehicle; and a shift determination module that determines whether to shift between gear ratios of the transmission based on whether the desired exhaust brake torque is greater than or equal to a predetermined amount of an exhaust brake torque capacity of the engine at a current engine speed, wherein the shift determination module upshifts between gear ratios of the transmission when vehicle acceleration is greater than a vehicle acceleration threshold or when exhaust brake torque after an upshift is less than the exhaust brake torque capacity of the engine.

5. The system of claim 4, wherein the shift determination module decrements a shift counter after an upshift between gear ratios of the transmission.

6. The system of claim 5, wherein the shift determination module maintains a current gear ratio of the transmission when the desired exhaust brake torque is less than a predetermined percentage of the exhaust brake torque capacity of the engine or when a difference between the actual and desired speeds of the vehicle is less than a predetermined speed threshold.

7. The system of claim 6, wherein the shift determination module downshifts between gear ratios of the transmission when the desired exhaust brake torque is greater than the predetermined percentage of the exhaust brake torque capacity of the engine and the difference between the actual and desired vehicle speeds is greater than the predetermined speed threshold.

8. The system of claim 7, wherein the shift determination module increments the shift counter after a downshift between gear ratios of the transmission.

9. The system of claim 8, wherein the predetermined speed threshold is based on at least one of a transmission range associated with a current gear ratio of the transmission and the shift counter.

10. A method for controlling a transmission of a vehicle powered by an engine, comprising:

using a torque determination module, determining a desired exhaust brake torque for the engine based on an actual speed of the vehicle and a desired speed of the vehicle;

using a shift determination module, determining whether to shift between gear ratios of the transmission based on whether the desired exhaust brake torque is greater than or equal to a predetermined amount of an exhaust brake torque capacity of the engine at a current engine speed; and using a speed determination module, determining the desired speed of the vehicle based on driver input during a predetermined period, wherein the driver input includes acceleration and braking of the vehicle.

11. The method of claim 10, further comprising determining the desired speed of the vehicle based on a cruise control speed input by a driver of the vehicle.

12. The method of claim 10, wherein the desired speed decreases based on braking of the vehicle, and wherein the desired speed increases and tracks the vehicle speed based on acceleration of the vehicle.

13. The method of claim 10, further comprising upshifting between gear ratios of the transmission when vehicle acceleration is greater than a vehicle acceleration threshold or when exhaust brake torque after an upshift is less than the exhaust brake torque capacity of the engine.

14. The method of claim 13, further comprising decrementing a shift counter after an upshift between gear ratios of the transmission.

15. The method of claim 14, further comprising maintaining a current gear ratio of the transmission when the desired exhaust brake torque is less than a predetermined percentage of the exhaust brake torque capacity of the engine or when a difference between the actual and desired speeds of the vehicle is less than a predetermined speed threshold.

16. The method of claim 15, further comprising downshifting between gear ratios of the transmission when the desired exhaust brake torque is greater than the predetermined percentage of the exhaust brake torque capacity of the engine and the difference between the actual and desired vehicle speeds is greater than the predetermined speed threshold.

17. The method of claim 16, further comprising incrementing the shift counter after a downshift between gear ratios of the transmission.

18. The method of claim 17, wherein the predetermined speed threshold is based on at least one of a transmission range associated with a current gear ratio of the transmission and the shift counter.

* * * * *